United States Patent [19]

Hazebrouck et al.

[11] Patent Number: 4,843,503

[45] Date of Patent: Jun. 27, 1989

[54] HEAD ARM DAMPING DEVICE FOR DISC DRIVE ACTUATORS

[75] Inventors: Henry B. Hazebrouck, Sunnyvale; Joseph T. Castagna, San Jose, both of Calif.

[73] Assignee: Priam Corporation, San Jose, Calif.

[21] Appl. No.: 133,946

[22] Filed: Dec. 17, 1987

[51] Int. Cl.⁴ .................... G11B 5/55; G11B 21/10; G11B 21/16
[52] U.S. Cl. .................... 360/106; 360/104; 360/128
[58] Field of Search .............. 360/98, 106, 128, 104

[56] References Cited

U.S. PATENT DOCUMENTS 3,864,747  2/1975  Pejcha .................... 360/98

Primary Examiner—Robert S. Tupper
Attorney, Agent, or Firm—Flehr, Hohbach, Test, Albritton & Herbert

[57] ABSTRACT

In an information storage system having a plurality of data storage medias which may be read and/or written onto by multiple read/write heads carried by a plurality of aligned head arms, a damping device is provided for reducing vibrations within the head arms. The damping device is formed of a compressible viscoelastic material having a relatively high loss factor.

12 Claims, 4 Drawing Sheets

U.S. Patent    Jun. 27, 1989    Sheet 1 of 4    4,843,503
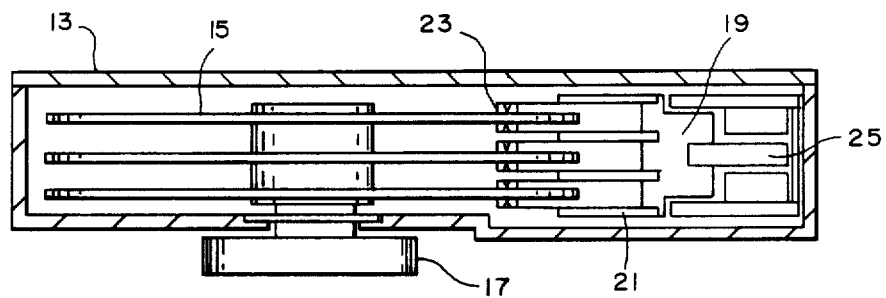
FIG.—1
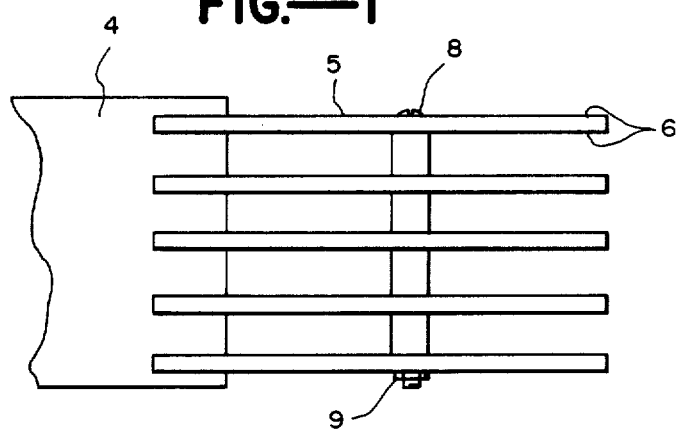
FIG.—2
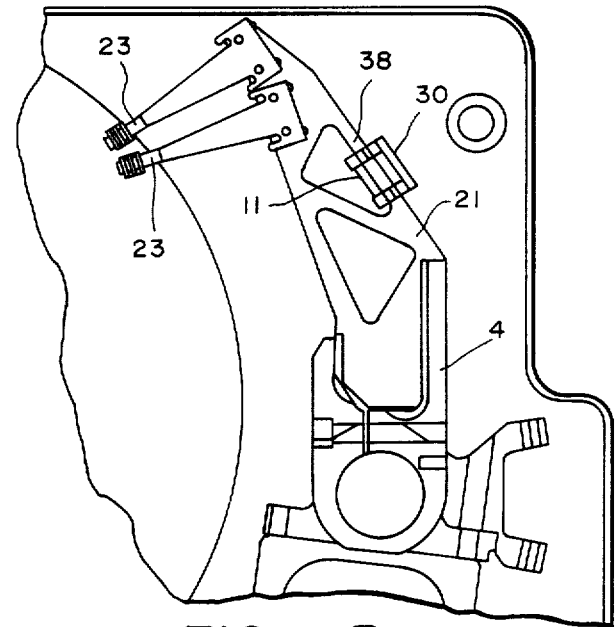
FIG.—3

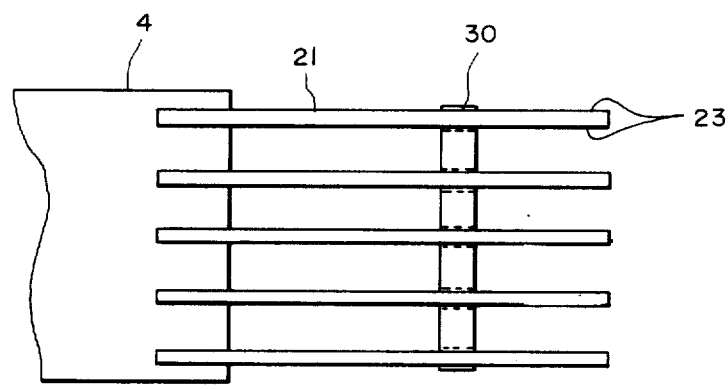
FIG.—4
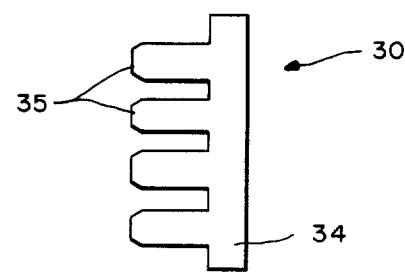
FIG.—5
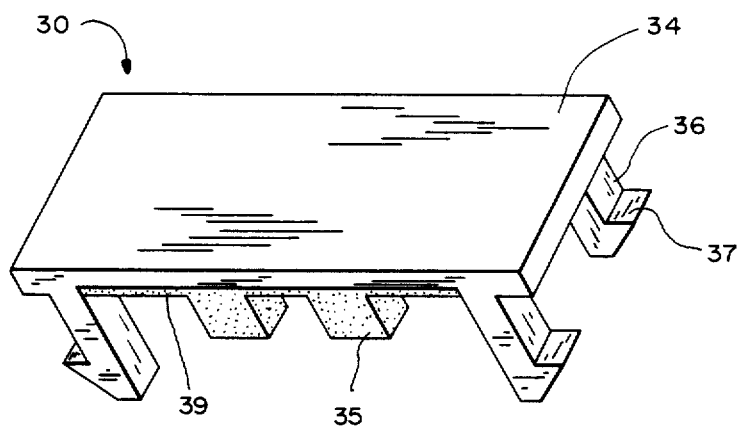
FIG.—6

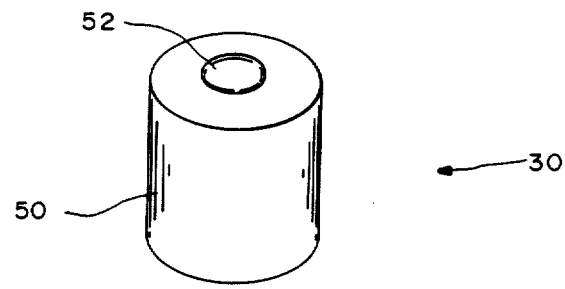
FIG.—7
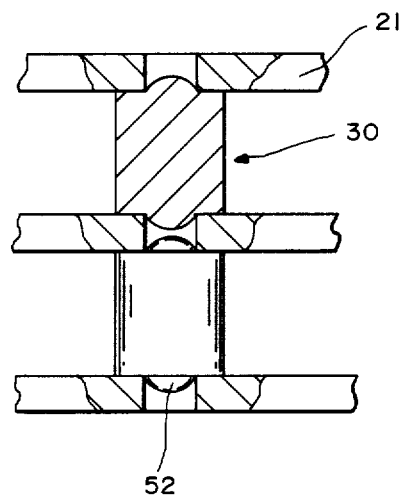
FIG.—8

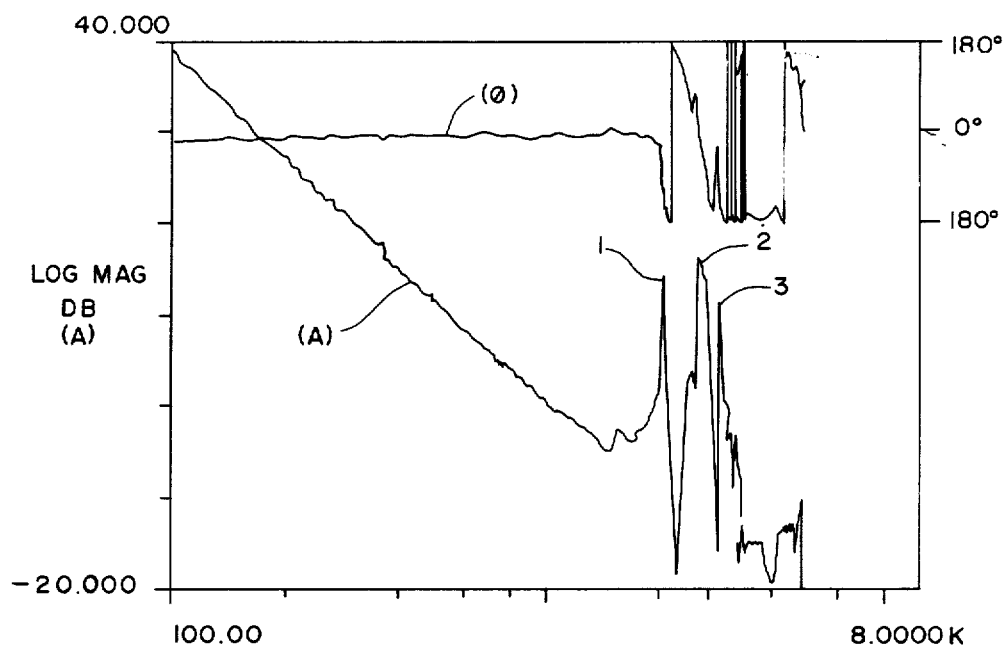
FIG.—9
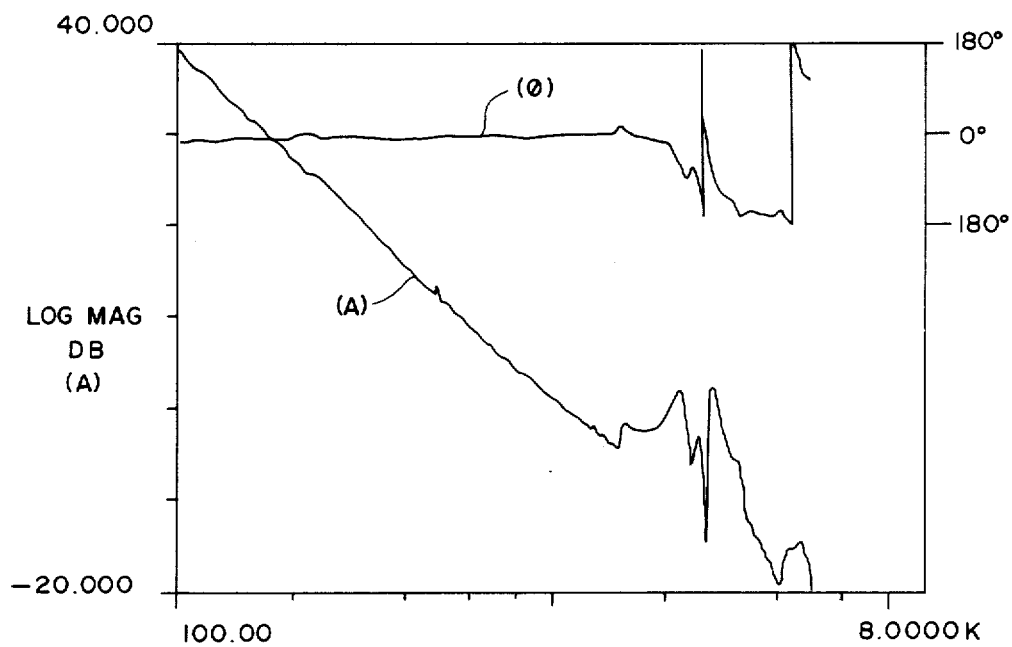
FIG.—10

HEAD ARM DAMPING DEVICE FOR DISC DRIVE ACTUATORS

BACKGROUND OF THE INVENTION

This invention relates generally to improving performance of disc drive actuators and their accompanying servo systems. More particularly, the present invention relates to a damping device that reduces vibrations between a plurality of elongated head arms thereby facilitating an improved head arm seek response and improving the overall drive performance.

A primary function of a disc drive actuator and its accompanying servo control system is to keep the read/write heads on track. Mechanical resonances within the actuator limit the precision of the tracking system and adversely effect the time required for the heads to settle after a seek. Many actuators, and most notably rotary actuators, have relatively long and flexible head arms. Such elongated head arms tend to have separate modes of vibration which are easily excited during normal operation of the disc drive. When such vibrations go undamped or are only lightly damped, they limit the overall performance of the disc drive. In the past, such control problems were typically overcome by limiting the bandwidth of the control system to movements that are not likely to excite such resonances. However, when relatively elongated head arms are used, merely limiting the performance of the control system will have an adverse effect on the overall drive performance.

Prior art attempts to align and support the heads have included efforts that placed inelastic spacer between each pair of adjacent head arms. The spacers and head arms are then joined together using a nut and bolt combination. However, such a system has several real disadvantages. To begin with, the spacers must be precision parts to prevent bending the head arms. Additionally, the removal of any one head arm requires the disassembly of the entire clamping device, including all spacers, and the nut and bolt combination. This drawback is amplified by the fact that such an alignment system is relatively difficult to assemble and disassemble. Further, the vibrations generated by such a device are lightly damped and produce large amounts of motion at resonance.

SUMMARY OF THE INVENTION

Therefore, it is a primary objective of the present invention to provide a device capable of reducing vibrations within a plurality of disc drive head arms, as well as reducing relative movement between such arms.

Another object of the present invention is to provide a head arm damping device that is easily assembled and disassembled.

Yet another object of the present invention is to provide a head arm damping device that facilitates the removal of a single head arm for maintenance without requiring disassembly of the entire damping device.

To achieve the foregoing and other objects and in accordance with the purpose of the present invention, a head arm damping device is provided for a disc drive system having a plurality of aligned head arms that each carry at least one head such as a magnetic read/write head. The damping device is formed of a viscoelastic material having a relatively high damping coefficient and is adapted for insertion between at least two adjacent head arms to reduce the relative motion therebetween as well as to reduce any uncontrolled vibratory motions.

A preferred embodiment the damping device includes a base member formed of a side rib that extends along one side of the aligned head arms. A plurality of fingers protrude from the side rib into the space between adjacent head arms. The fingers are sized and shaped such that they are snugly received between adjacent head arms yet are not so large as to bend the head arms out of position.

In another preferred embodiment, a plurality of clamping feet are provided. The clamping feet are positioned near the distal ends of opposing fingers to affirmatively latch the damping device to at least two of the head arms. This insures that the damping device will be properly positioned during assembly and that it does not slip during extended use.

In an alternative preferred embodiment, the damping device includes a plurality of locking tabs adapted to snugly fit within apertures in the head arms to affirmatively hold the damping device in place.

In yet another alternative preferred embodiment, the damping device is formed of a material having a loss factor in the range of 0.30 to 1.2.

BRIEF DESCRIPTION OF THE DRAWINGS

Features of the present invention that are believed to be novel are set forth with particularity in the appended claims. The invention, together with further objects and advantages thereof, may best be understood by reference to the following description taken in conjunction with the accompanying drawings in which:

FIG. 1 is a partially cut-away side view of a disc drive incorporating a rotary type actuator that shows the general layout and locations of several of the key drive components.

FIG. 2 is a schematic side view of a plurality of elongated head arms that are joined by a prior art damping device.

FIG. 3 is a top plan view of a head arm assembly incorporating a damping device made in accordance with the teachings of the present invention.

FIG. 4 is a side elevational view showing a plurality of head arms incorporating an alternative embodiment of the present invention.

FIG. 5 is a side elevational view of the damping device shown in FIG. 4.

FIG. 6 is a perspective view of the damping device as shown in FIG. 3.

FIG. 7 is a perspective view of another alternative embodiment of the damping device.

FIG. 8 is a partially broken away side view of a pair of damping devices as shown in FIG. 7 that are installed between adjacent head arms.

FIG. 9 is a graph showing the transfer function of an undamped head arm.

FIG. 10 is a graph showing the transfer function of the head arm shown in FIG. 9 after the addition of a damping device in accordance with the teaching of the present invention.

DETAILED DESCRIPTION OF ILLUSTRATIVE EMBODIMENTS

As illustrated in the drawings, a disc drive system that incorporates the teachings of the present invention includes a housing 13 that contains most of the disc drive components. A plurality of information storage discs 15 are journaled about a spindle motor assembly 17. A rotary actuator 19 carries a plurality of head arms 21, each having at least one associated read/write head 23 adapted for transferring information between the information storage discs 15 and an external computer system. A voice coil motor 25 (VCM) provides precise rotary movement to rotary actuator 19 to accurately position heads 23. Thus, the combined motions of rotary actuator 19 and spindle motor assembly 17 allow the heads 23 to randomly access any segment of the discs 15.

A prior art alignment device is shown in FIG. 2. It includes a plurality of separate solid spacers 7 that are inserted between adjacent head arms 5. The spacers are intended to both provide structural support for and align the head arms 5. The spacers 7 are then clamped together thereby restricting relative motion between the head arms. A fastening device such as the nut and bolt combination 8 is used to retain and properly position the spaces 7 relative to head arms 5. However, such a system has several real disadvantages. To begin with, no damping is provided between the head arms 5, and spacers 7 must be precision parts to prevent bending the head arms 5. Additionally, the removal of any one head arm 5 requires the disassembly of the entire clamping device, including all spacers 7 and the fastening device 8 and 9. This drawback is amplified by the fact that such a system is relatively difficult to assemble and disassemble.

Reference is next made to FIGS. 3 and 4 which show alternative embodiments of the damping device 30 which comprises the present invention. A plurality of head arms 21 are stacked in vertical alignment. Each head arm 21 includes a pair of read/write heads 23, which are adapted to read and write information to and from discs 15. As will be appreciated by those skilled in the art, the relatively elongated and thin head arms 21 necessary in many disc drive designs, frequently have lightly damped vibratory modes which may become excited during operation of the drive unit. To increase damping of the vertically aligned head arms 21, a damping device 30 is provided. Damping device 30 includes a side rib 34 along with a plurality of fingers 35 that are adapted to fit snugly between adjacent head arms 21. The damping device 30 is formed of a viscoelastic material and reduces vibratory motions within the head arms.

The embodiment shown in FIG. 5 is adapted to fit on a stack of five head arms. Side rib 34 is rectangular in shape and includes a plurality of fingers 35. A single finger 35 is designed to fit in the space between each pair of adjacent head arms 21. Fingers 35 may be any length, so long as they do not contact any drive parts other than the head arms 21. An optimal length is approximately the same length as the width of the head arms 21 at the point of attachment.

An alternative embodiment of the damping device 30 is shown in FIG. 6. In that embodiment, the damping device 30 includes a side rib 34 having exterior fingers 36 depending therefrom, and a damping insert 39 having interior fingers 35. Side rib 34 is formed of a structural material such as plastic, while the damping insert 39 is formed of an damping material. Two side by side fingers 35 are designed to fit in the spaces between each pair of adjacent head arms 21, thus damping device 30 incorporates two rows of fingers. It should be appreciated that the actual number of fingers 35 located between each pair of adjacent head arms 21 may be readily adjusted. Thus, it is contemplated that only a single finger 35, or alternatively more than two fingers 35, occupy a portion of the space between adjoining head arms 21. Clamping feet 37 are provided on the exterior fingers 36 to firmly secure damping device 30 to the head arms 21. As can best be understood with reference to FIG. 3, fingers 36 and clamping feet 37 are sized and shaped so as to tightly receive a beam member 38 which forms a part of head arm 21, thereby securely holding damping device 30 in place.

Damping device 30 may be formed of any compressible viscoelastic material which is not so soft as to allow free vertical movement between the head arms, yet not so stiff as to directly transmit all vibrations. By way of example, a suitable material is a viscoelastic material such as EAR C1002 manufactured by Cabot Corp. of Indianapolis, Ind. Also by way of example, a suitably viscoelastic material would have a loss factor in the range of 0.30 to 1.2.

Any number of means can be used to fasten the damping device 30 to the head arms 21. By way of example, an adhesive may be used to bond the damping device 30 to the head arms 21. Alternatively, damping device 30 may be held in place by the friction generated by a press fit. Still another alternative fastening mechanism is shown with reference to FIGS. 3 and 5 wherein clamping feet 37 are used as previously discussed.

It should be noted that this invention is not limited to a single damping device which is in contact with all of the head arms 21. Rather, several damping devices could be incorporated into a drive unit with multiple head arms. By way of example, a damping device could be provided between each adjacent pair of head arms.

Another alternative embodiment of the present invention is shown in FIGS. 7 and 8. A damping device 30 which is designed to fit between two adjacent head arms 21 include a body 50 formed of a viscoelastic material. The body 50 may take any desired shape which is suitable for placement between adjacent head arms 21. By way of example, a cylindrical body shape 50 would be appropriate. Locating tabs 52 are disposed on both the top and bottom surfaces of body 50 in order to engage the head arms 21 as can be seen with reference to FIG. 8. It will be appreciated that the actual design of locating tabs 52 may vary greatly without diminishing their effectiveness in securing the damping device 30 in place between adjacent head arms 21. Locating tabs 52 are preferably formed from the same viscoelastic as damper body 50 to facilitate both insertion between adjacent head arms and their manufacture. As will be appreciated by those skilled in the art, the actual geometry of both the damper body 50 and the locating tab 52 may be varied greatly without departing from the present invention.

FIGS. 9 and 10 are graphs showing the transfer functions of undamped, and damped head arms respectively. In each graph the frequency is plotted in logarithmic fashion along the X axis while the amplitude of displacement is plotted along the Y axis. In each case, both the amplitude of displacement and the phase are shown. The displacement is labeled "A", while the phase is labeled "$\phi$" on the graphs. As will be appreciated by those skilled in the art, the improved control characteristics exhibited by the head arms incorporating the damping device disclosed herein facilitate a significantly improved head arm seek response that reduces the amount of time that must be allocated for the head arms to settle after a seek.

Although only a few embodiments of the present invention have been described, it should be understood that the present invention can be embodied in many other specific forms without departing from the spirit or scope of the invention. Particularly, there are a wide variety of geometries that the damping device could take without seriously degrading the system's performance. Similarly, the particular material used to form the damping device may be widely varied so long as the selected material has a high loss factor. Further, a single damping device could be used between the servo arm and an adjacent arm to damp only the servo arm resonance. Therefore, the present examples and embodiments are to be considered illustrative and not restrictive, and the invention is not to be limited to the details given herein, but may be modified within the scope of the appended claims.

We claim:

1. In an information storage system having a housing that contains a spindle motor assembly about which a plurality of data storage discs may be journaled, a plurality of spaced apart aligned head arms that each carry at least one magnetic head for transferring data between an associated one of said discs and an external system, and a servo control system for selectively positioning said heads relative to said discs, the improvement comprising:

a damping device adapted for insertion between at least two adjacent head arms, the damping device including a side rib that extends along one side of the aligned head arms and a plurality of compressible fingers that protrude from said side rib into the spaces between said adjacent head arms to mechanically connect the adjacent head arms, whereby the damping device damps both the absolute motions of the connected head arms and the relative motions between the connected head arms.

2. A damping device as recited in claim 1, wherein said fingers are formed from a viscoelastic material having a loss factor in the range of 0.30 to 1.2.

3. A damping device as recited in claim 1, further comprising a first clamp foot attached to a first one of said fingers for engaging a first one of said head arms, and a second clamp foot attached to a second one of said fingers for engaging a second one of said head arms.

4. A damping device as recited in claim 1, wherein at least two of said fingers protrude between each pair of adjacent head arms.

5. A damping device as recited in claim 1 wherein said side rib is formed from a plastic material.

6. In an information storage system having a housing that contains a spindle motor assembly about which a plurality of spaced apart data storage discs may be journaled, a plurality of aligned head arms that each carry at least one magnetic head for transferring data between an associated one of said discs and an external system, and a servo control system for selectively positioning said heads relative to said discs, the improvement comprising:

a damping device formed of a viscoelastic material and adapted for insertion between at least two adjacent head arms to mechanically connect the adjacent head arms for damping both the absolute motion of the connected head arms and the relative movement between the connected head arms; and attachment means for attaching said damping device to said head arms, said attachment means including a plurality of locking tabs for engaging said head arms.

7. A damping device as in claim 6, wherein said damping device is formed of a material having a loss factor in the range of 0.30 to 1.2.

8. A damping device as in claim 6, wherein said head arm includes an aperture and each said locking tab is adapted to engage a particular aperture to hold the damping device in place.

9. A damping device as in claim 6 wherein said damping device includes a side rib that extends along one side of the aligned head arms and a plurality of fingers that protrude from said side rib into the spaces between adjacent head arms.

10. In an information storage system having a housing that contains a spindle motor assembly about which a plurality of data storage discs may be journaled, a plurality of spaced apart aligned head arms that each carry at least one magnetic head for transferring data between an associated one of said discs and an external system, and a servo control system for selectively positioning said heads relative to said discs, the improvement comprising:

a damping device adapted for insertion between a plurality of head arms, the damping device including a side rib that extends along one side of the head arms, at least two external fingers that protrude from the side rib to engage corresponding head arms, and at least one internal finger disposed between said external fingers and formed from a viscoelastic material, the internal finger protruding into the space between adjacent head arms for damping movement of the head arms.

11. A damping device as recited in claim 10, wherein each said external finger includes a clamping foot for securing the external finger to an adjacent head arm.

12. A damping device as recited in claim 11, wherein said side rib and said external fingers are formed from a substantially rigid material.

* * * * *